United States Patent
McHugh et al.

[11] Patent Number: 5,682,023
[45] Date of Patent: Oct. 28, 1997

[54] TIME-OPTIMAL CONTROL OF AN AC LINE-DRIVEN LINEAR MOTOR ELEVATOR DOOR OPERATOR

[75] Inventors: Thomas M. McHugh, Farmington; Richard E. Peruggi, Glastonbury, both of Conn.; Edward E. Ahigian, Arlington Heights, Ill.; Jerome F. Jaminet, South Windsor, Conn.; Thomas He, Unionville, Conn.; Thomas M. Kowalczyk, Farmington, Conn.; Richard E. Kulak, Bristol, Conn.; David W. Barrett, East Hartford, Conn.

[73] Assignee: Otis Elevator Company, Farmington, Conn.

[21] Appl. No.: 533,594

[22] Filed: Sep. 25, 1995

[51] Int. Cl.$^6$ .................................................. B66B 13/14
[52] U.S. Cl. ............................ 187/316; 187/293; 49/103
[58] Field of Search ............................ 187/316, 317, 187/293; 49/103

[56] References Cited

U.S. PATENT DOCUMENTS

| | | | |
|---|---|---|---|
| 3,462,883 | 8/1969 | Reeks et al. | 49/360 |
| 3,604,537 | 9/1971 | Holuba et al. | 187/316 |
| 3,708,915 | 1/1973 | Davey | 49/340 |
| 3,793,944 | 2/1974 | Grubich et al. | 100/53 |
| 3,872,622 | 3/1975 | Berk | 49/118 |
| 3,891,907 | 6/1975 | Lenzkes et al. | 318/369 |
| 3,895,585 | 7/1975 | Schwärzler | 104/148 |
| 4,067,144 | 1/1978 | Ogishi | 49/360 |
| 4,090,113 | 5/1978 | Ogishi | 49/300 |
| 4,188,552 | 2/1980 | Brimer | 310/13 |
| 4,305,481 | 12/1981 | Hmelovsky et al. | 187/29 R |
| 4,365,442 | 12/1982 | Speer | 49/340 |
| 4,698,876 | 10/1987 | Karita | 16/102 |
| 4,858,452 | 8/1989 | Ibrahim | 70/275 |
| 4,876,765 | 10/1989 | Karita | 16/102 |
| 4,959,598 | 9/1990 | Yoshida et al. | 318/599 |
| 5,134,324 | 7/1992 | Sakagami et al. | 310/12 |
| 5,172,518 | 12/1992 | Yshino | 49/360 |
| 5,274,312 | 12/1993 | Gerstenkorn | 318/617 |
| 5,373,120 | 12/1994 | Barrett et al. | 187/316 |
| 5,378,861 | 1/1995 | Barten et al. | 187/316 |

FOREIGN PATENT DOCUMENTS

| | | | |
|---|---|---|---|
| 3264486 | 11/1991 | Japan . | |
| 3-293285 | 12/1991 | Japan | 187/316 |
| 1148444 | 4/1969 | United Kingdom . | |

OTHER PUBLICATIONS

"Linear direct drives featuring three-phase asynchronous motors", a brochure from Automation & Servo Technologies, Inc. a U.S. representative of Krauss Maffei AG.

Primary Examiner—Robert Nappi

[57] ABSTRACT

A linear motor for operating an elevator door is energized using a bang-bang control strategy (10) wherein three-phase AC utility mains (16) are connected (29) directly to the linear motor primary (14) by means of a motor control (12) in response to control signals (26) provided under the direction of a control strategy (10), which may be microprocessor-based. Commands (24) from an elevator controller to open/close the elevator door cause the system to operate the doors and a sensor (22) provides feedback (28) by means of which the control (10) is able to determine switch points for switching the AC mains.

15 Claims, 10 Drawing Sheets

STATE TRANSITION TABLE

INPUTS (11 BITS)

| OPERATIONAL MODE | REMAINING DTG | CURRENT VELOCITY | | | | |
|---|---|---|---|---|---|---|
| OPMODE | X | V | Mode2decel | Mode3decel | Mode3endaccel | |
| 00 (1) | 00 (X > end-distance) | 00 (V < $V_{MAX}$) | 0 | 0 | 0 | |
| 01 (2) | 01 (X > SPT) | 01 (V ≥ $V_{MAX}$) | 1 | 1 | 1 | |
| 10 (3) | 10 (X < end-distance) | 10 (V < $V_2$) | | | | |
| | 11 (X ≤ swstate-3dist) | 11 (V ≥ $V_2$) | | | | |

OUTPUTS (2 BITS)

TRIAC STATE

- 00 (CLEAR – NOT ENERGIZED)
- 01 (ACCELERATE IN DIRECTION OF TRAVEL)
- 10 (DECELERATE OPPOSITE TO DIRECTION OF TRAVEL)
- 11 (NOT ENERGIZED)

MOT STATE

- 00 NOT ENERGIZED
- 01 ENERGIZED IN DIRECTION OF TRAVEL
- 10 ENERGIZED OPPOSITE TO DIRECTION OF TRAVEL
- 11 NOT ENERGIZED

TIME-OPTIMAL CONTROL OF AN AC LINE-DRIVEN LINEAR MOTOR ELEVATOR DOOR OPERATOR

TECHNICAL FIELD

This invention relates to elevators and, more particularly, to a linear motor for actuating an elevator door.

BACKGROUND OF THE INVENTION

A linear door motor system for elevators is disclosed in U.S. Pat. No. 5,373,120, assigned to Assignee hereof. That system used a linear motor control for controlling a rotational torque that varies with horizontal door movement (caused by a vertical force exerted vertically by the linear motor acting through a variable-length moment arm about the door's center of gravity). It counteracts this rotational torque on the door by varying the horizontal force for moving the door (caused by the linear motor acting through a fixed-length moment arm about the door's center of gravity). That motor control was eventually implemented by means of an electronic variable voltage/frequency motor drive that runs at 10–20 Hz and 0–170 volts and is highly effective, especially for high-performance elevator installations where a fast door open time (e.g., one second) is demanded and where high component cost can be tolerated, i.e., for the sake of high speed, reduction of noise (by eliminating the need for mechanical linkages driven by a rotary motor) and increased reliability.

The control strategy of U.S. Pat. No. 5,373,120 was, as shown in FIG. 13 thereof, to use a quasi-elliptical velocity profile. This was in contrast to the (simplified) "ramp up" and "ramp down" velocity profile of the prior art electromechanical door operator shown in FIG. 1 thereof. Naturally, it would be most advantageous to be able to use the linear motor concept for lower-cost elevators for the same reasons, i.e. replacing the old-style electromechanical door operator. However, the cost of the electronics, particularly the presently-implemented electronic variable voltage/frequency motor drive, puts this innovation out of reach for most new equipment installations.

DISCLOSURE OF INVENTION

An object of the present invention is to provide a linear door motor system for elevators using a different approach so that such a system can be widely used for many different types of elevator installations.

According to the present invention, an elevator door is operated by means of a linear induction motor by energizing, in response to a start command, the linear induction motor with AC power mains fixed in frequency at 50 or 60 Hz for accelerating the door, the position of which is sensed for providing a sensed signal for comparison during a door open sequence with a first reference position signal for providing a first reverse command signal and deenergizing the linear induction motor in response to the first reverse command signal, and reenergizing the linear induction motor with the AC power mains for decelerating the door, comparing the sensed signal to a second reference position signal for providing a second reverse command signal, and deenergizing the linear induction motor in response to the second reverse command signal and reenergizing the linear induction motor with the AC power mains for accelerating said door to a stop.

The reason for accelerating the door to a stop is that there would be expected to be a small creep distance which one

2 would want the elevator door to traverse in completely opening or closing. Thus, the door would be fully accelerated to bump the door into its stop and then shut the linear induction motor off, and, if desired, at the same time brake the door in the fully open or closed position.

On the other hand, if there is expected to be a negligible or zero creep distance, then there is no need to energize the linear induction motor to accelerate the door between the second reference position and any third reference position, and the door can be braked directly in response to the second reverse command signal.

In still further accord with the present invention, if before reaching said first reference position, said door is determined to have reached a maximum velocity, the door is held at that maximum velocity by either repeatedly reversing the AC mains or by turning the mains on and off, until the door reaches a third reference position, at which point it is decelerated to the second reference position.

The control strategy of the present invention provides a linear door motor system for elevators using a simple, bang—bang approach so that such a system can be widely used for many different types of elevator system installations. It allows the replacement of the electromechanical door operator of the prior art and is able to achieve high speed, reduction of noise and increased reliability by eliminating the need for mechanical linkages driven by a rotary motor.

These and other objects, features and advantages of the present invention will become more apparent in light of the detailed description of a best mode embodiment thereof, as illustrated in the accompanying drawing.

BRIEF DESCRIPTION OF THE DRAWING

FIG. 9 shows controller input/output definitions according to the present invention.

BEST MODE FOR CARRYING OUT THE INVENTION

Figure 1:
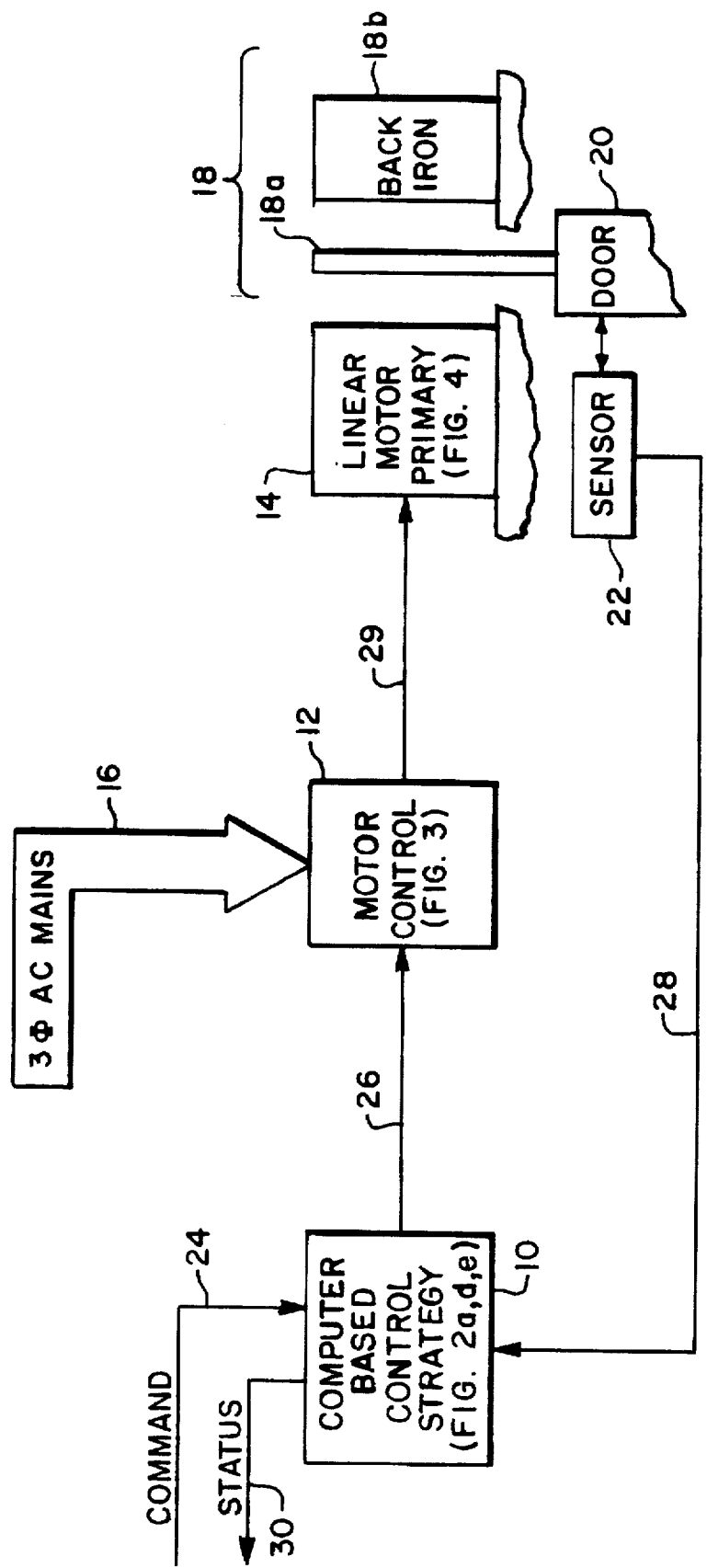
FIG. 1 shows a linear door motor system for an elevator, according to the present invention.

FIG. 1 shows a linear door motor system for actuating an elevator door, according to the present invention. It differs from the linear door motor system of U.S. Pat. No. 5,373,120 in using a different motor orientation, a different computer control strategy 10, a different motor control 12 and a different linear motor primary 14, all of which have been selected and designed so as to make the concept more readily adaptable to elevator installations of all types, particularly lower-cost elevator installations.

Given that the single most expensive item in the implemented linear door motor system disclosed in U.S. Pat. No. 5,373,120 was the motor control shown in FIG. 4 thereof, the motor control was targeted as the single most important component in achieving a cost-effective linear induction motor (LIM) driven elevator door. The underlying idea of the present invention was to drive the linear motor primary 14 directly from the AC supply line 16, by means of the motor control 12 of the present disclosure, thereby eliminating the relatively expensive drive described above. However, such a configuration would not allow continuous control of the thrust output by the LIM. Nevertheless, by utilizing a time-optimal control strategy of bang/bang control in which the LIM is made to apply full thrust to accelerate the doors, or full thrust to decelerate the doors with the points of switching between accelerate and decelerate determined by a setting of switching curves, the desired powering of the LIM directly from the AC supply line is achieved. The motor control 12 can use TRIAC switches to accomplish the switching of the three-phase AC line 16. The linear motor primary 14 is designed and optimized to operate at the frequency of the AC mains, typically 50 or 60 Hz. This motor can be made of two or more poles and one or more, e.g., three phases. The LIM operates at high slip, so that it never approaches synchronous speed and, as such, has the characteristics of a forcer, producing an almost constant thrust over its entire normal operating envelope.

As described in more detail below, the motor control 12 connects the individual linear motor primary phase windings to the appropriate phase or phases of the incoming AC mains 16.

The linear motor primary 14 is fixedly mounted to the elevator cab, and a copper sheet part 18a of a linear motor secondary 18 is mounted to a movable elevator door 20 while a ferromagnetic backiron part 18b is mounted to the cab, such that thrust is applied to the movable door when the primary is energized. Door position and velocity are measured via a sensor 22, which may be implemented as a linear optical strip mounted on the movable door with a pickup on the cab.

As will be evident from FIG. 1, the linear motor has been oriented differently from the orientation shown in U.S. Pat. No. 5,373,120, where the primary was mounted above the door and the secondary was placed flat on the top edge of the door so that a perpendicular axis bridging the gap from the primary to the secondary is vertical. According to the illustration of FIG. 1 hereof, the motor is rotated ninety degrees so that the perpendicular axis bridging the gap from the primary to the secondary is horizontal, rather than vertical. It should be realized, however, that the invention hereof may be used with any linear motor arrangement for driving an elevator door.

A microprocessor may be employed to carry out the computer control strategy 10, to read the sensor 22 and to respond to a command signal on a line 24 from an elevator controller (not shown) for providing switching commands on a line 26 to the motor control 12. The computer control strategy 10 reads sensor signals on a line 28 from the sensor 22 and provides switching commands on the line 26 that result in current on a line 29 for full acceleration or reverse current for full deceleration, depending on pre-computed switch points, as described below.

The motor control 12, which may be implemented as a TRIAC electronic switch circuit, thus applies 50/60 Hz line voltage 16 on the line 29 to the linear motor primary 14 windings to effect the commanded thrust. Status information may be provided back to the elevator controller (not shown) on a line 30 from the computer control strategy 10.

Figure 2A:
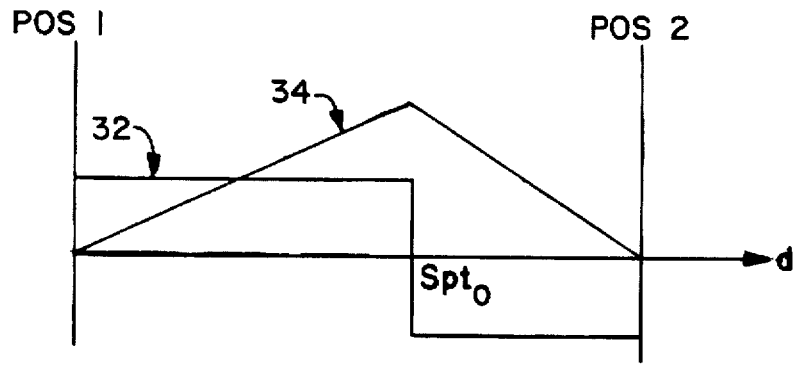
FIGS. 2a–2e show various instances of control strategies, some of which are optimal, according to the present invention.
Figure 2B:
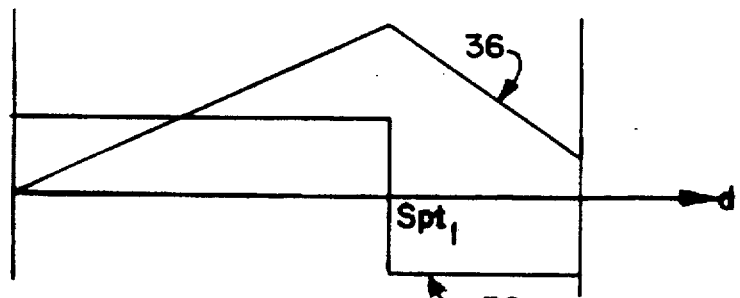

As shown in more detail in FIGS. 2a–e, the control problem is to traverse the travel distance d in minimum time from a first position (POS1) with zero velocity to a second position (POS2) with zero velocity. The travel distance from POS1 to POS2 is known prior to the start of door motion. Door position can be measured by the sensor 22 of FIG. 1 and the velocity and/or acceleration derived therefrom. The theory of time-optimal control specifies a bang/bang control in which full acceleration, as indicated by an acceleration profile 32 in FIG. 2a, is applied until a predetermined switch point $spt_0$, after which full deceleration is applied. It may be assumed for purposes of the illustration that POS1 corresponds to a door closed position and POS2 a door open position. A velocity profile 34 corresponds to the acceleration profile 32. FIG. 2a therefore shows $spt_0$ as the time-optimal switch point, for controlling the door so that it reaches the fully-open position (POS2) at zero velocity, i.e., it exactly stops at that point. FIG. 2b shows a switch point $spt_1$ that is later than $spt_0$, so that the door still has a positive velocity at POS2, as indicated by a velocity profile 36, while still being decelerated as indicated by an acceleration profile 38 at the time of reaching POS2, at which point it crashes into the stop. Obviously, switch point $spt_1$ is not optimal and would not be a good selection.

Figure 2C:
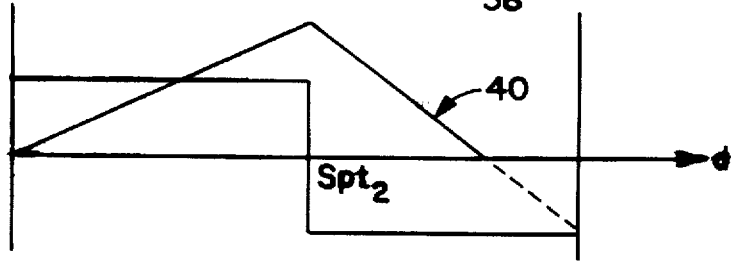

FIG. 2c shows a case where the switch point $spt_2$ is earlier than $spt_0$, and the door reaches zero velocity as indicated by a velocity profile 40 before reaching the fully-opened position. Having thus stopped, it will begin going backwards if the drive isn't shut off. Similarly, switch point $spt_2$ is also not an optimal choice.

Figure 2D:
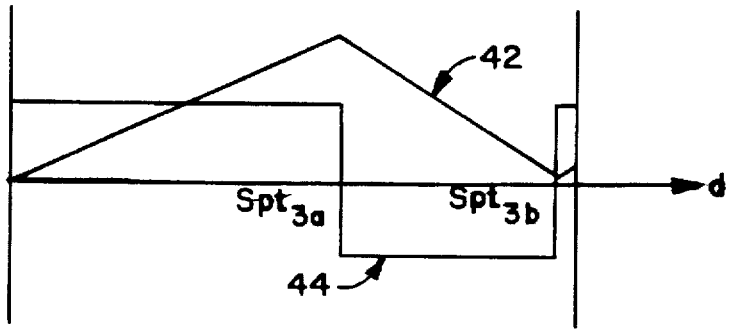

FIG. 2d shows another optimal case where a switch point $spt_{3a}$, is just slightly earlier than $spt_0$. As shown by a velocity profile 42, the door stops at a position $spt_{3b}$ just short of fully open. A second full acceleration is then applied to fully open the door through a controlled "crash" into the stop, as indicated by the velocity profile 42 and an acceleration profile 44.

Figure 2E:
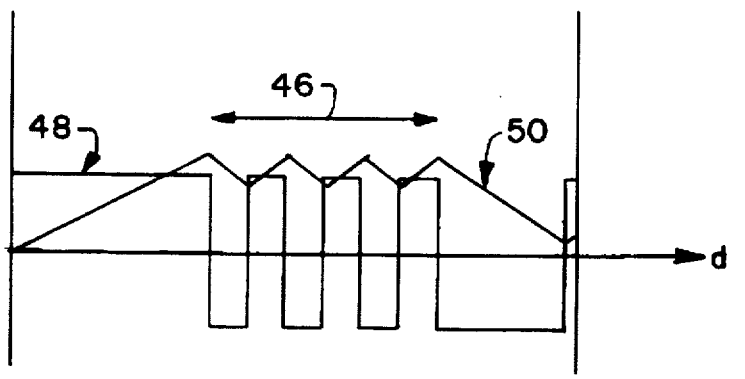

FIG. 2e shows another optimal case with a pseudo-constant-velocity portion of travel 46 made up of short acceleration/deceleration bursts, as indicated by an acceleration profile 48. The decelerations can be replaced by an "OFF" state (for a longer time period) with friction slowing the door down instead. As can be seen by a velocity profile 50, the velocity is somewhat choppy but relatively constant during the pseudo-constant-speed portion of travel 46.

Figure 3:
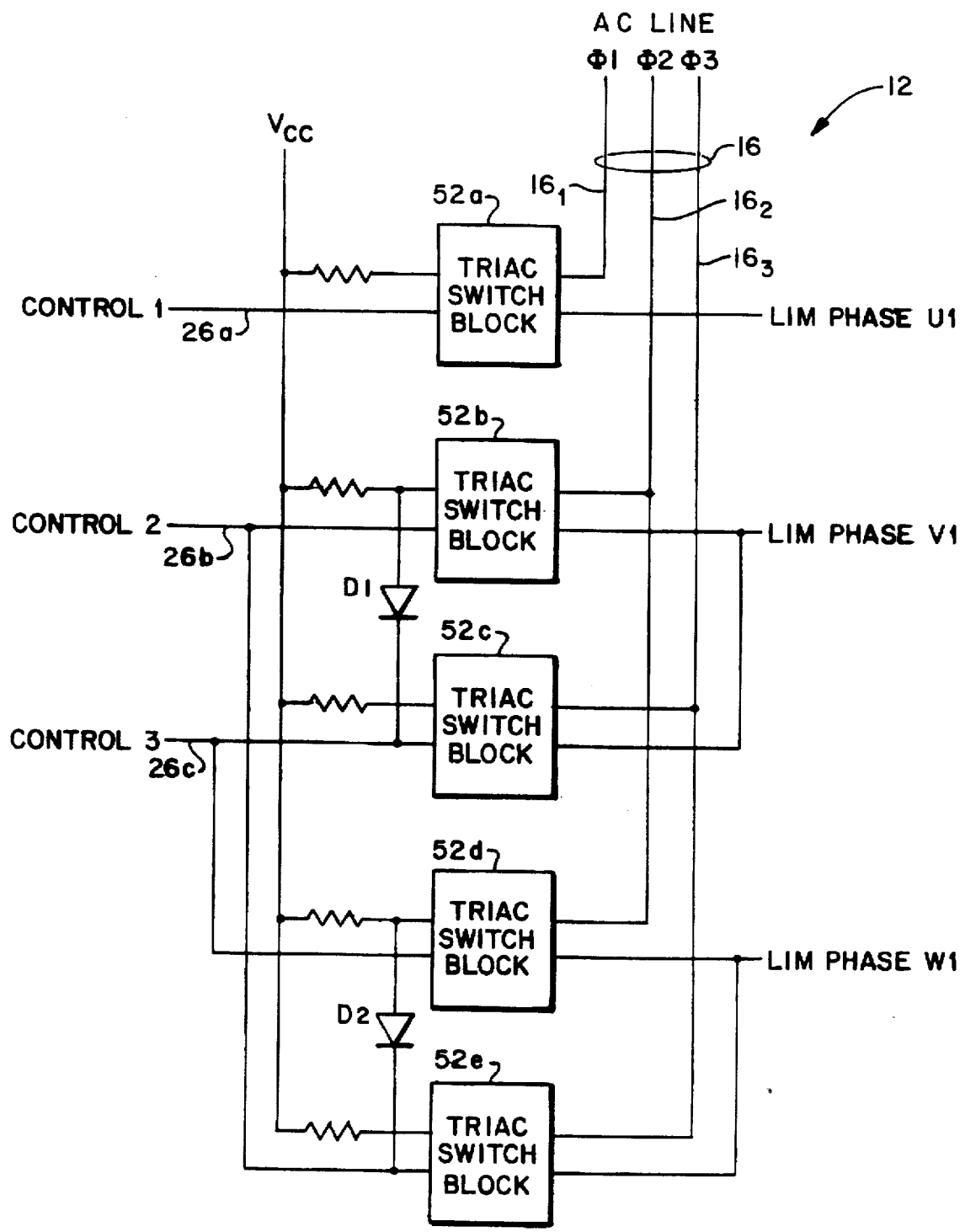
FIG. 3 shows a motor control, according to the present invention.

Turning now to FIG. 3, the motor control 12 of FIG. 1 is shown carried out using an array of TRIAC switches 52a–e to produce the desired forces from the linear motor. The TRIAC drive 12 is capable of producing acceleration, deceleration or coasting in either the open or closed direction of operation. When controlled by an algorithm such as a "time-optimal switch point" or "bang/bang" control strategy, such as shown in FIG. 2a, 2d or 2e, the TRIAC drive produces the required motions from the linear induction motor (LIM) 14 for elevator door operation.

The LIM 14 produces full thrust in a given direction (e.g., for accelerating an opening door or decelerating a closing door) when the three phase windings (motor coils) U, V, W of the LIM 14 are connected in a particular manner to the three phases of the AC line 16. The LIM 14 produces full thrust in a direction opposite to the given direction (e.g., for decelerating an opening door or accelerating a closing door)

by reversing the connections of any two of the three motor phases to the AC line. On the other hand, disconnecting the phase windings from the AC line allows the LIM (along with the elevator door) to coast without producing thrust in either direction. The motor control or TRIAC drive 12 uses TRIAC switches 52a–e to accomplish the required switching function under the control of the computer control strategy 10 of FIG. 1 by means of control lines 26a, 26b, 26c.

Figure 4:
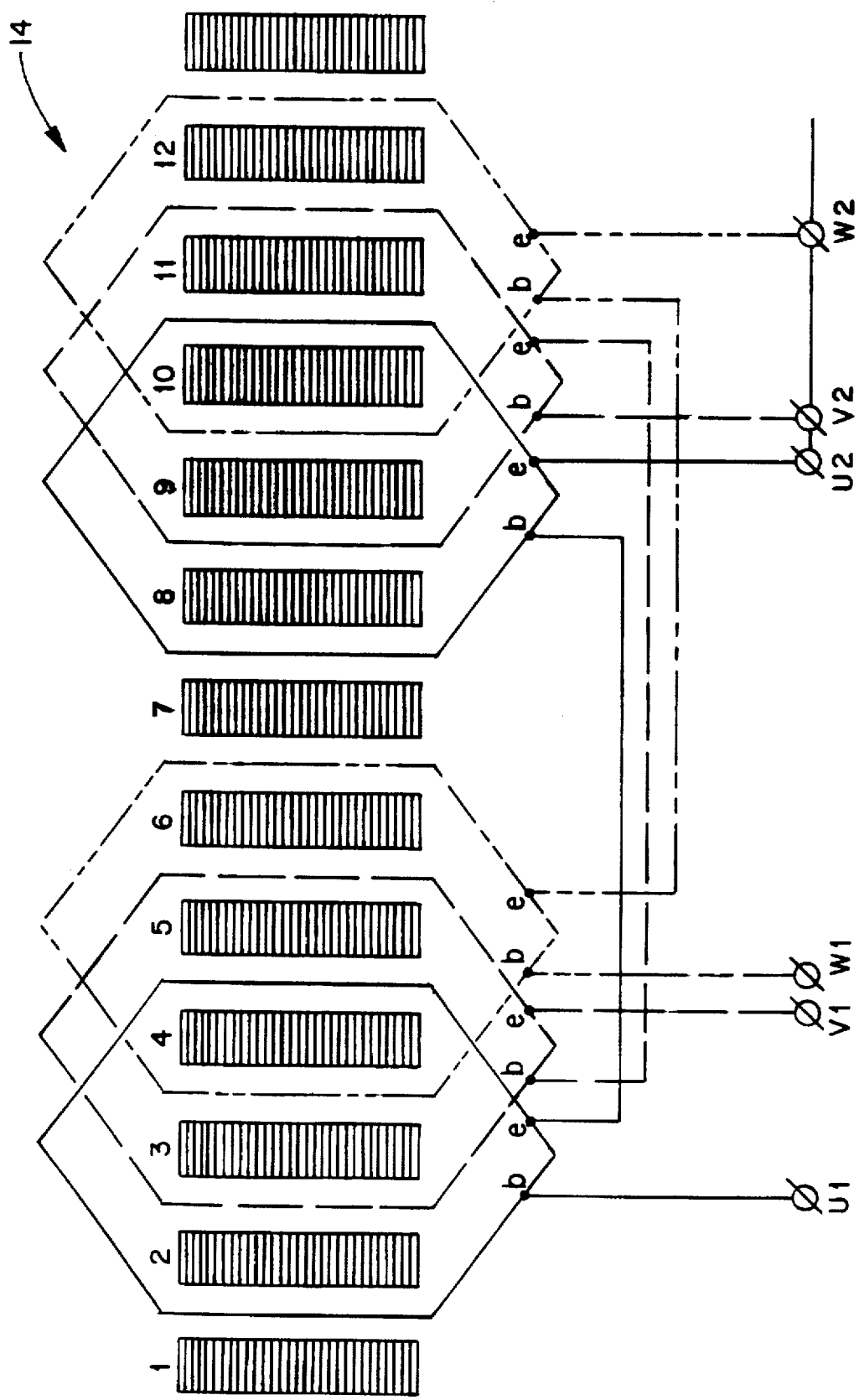
FIG. 4 shows a linear motor primary with a winding arrangement, according to the present invention.

FIG. 4 shows a winding pattern for a linear motor primary 14 implemented as a four-pole, three-phase primary. The wiring pattern illustrated is connected as a wye-connected three-phase winding, each winding spanning four slots with beginning (b) and ending (e) leads connected as illustrated. The U1, V1, W1 leads are connected to the corresponding U1, V1, W1 phase leads of FIG. 3 from the TRIAC switch blocks 52a, 52b, 52d, respectively. A particular embodiment of the linear motor primary 14 of FIG. 4 provides 95 Newtons of force using AWG 20 copper wire (0.813 mm outside dimension), wherein each coil shown in FIG. 4 has 220 turns. The overall length dimension for the primary of FIG. 4 is 170 mm, while the width is 64 mm. The overall height (perpendicular to the plane of the paper) is approximately 50 mm, while the slot length is 33 mm and is 8.6 mm wide.

Figure 5:
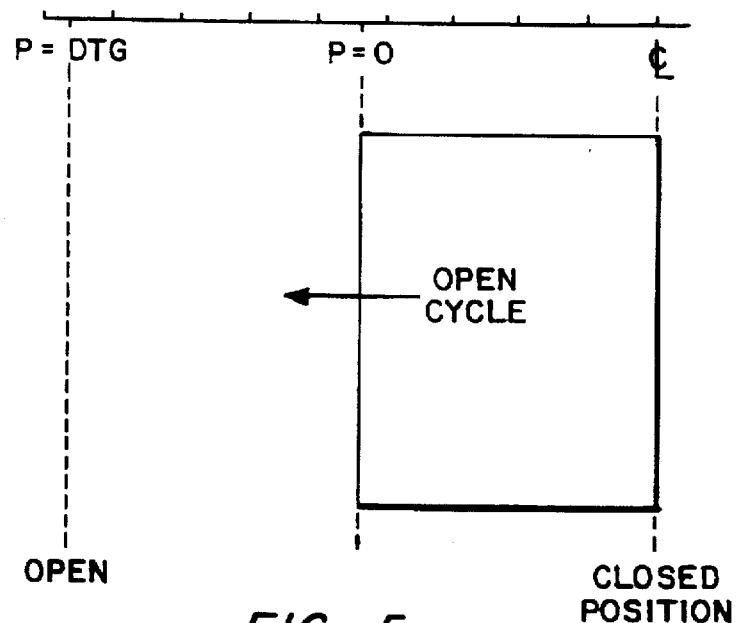
FIG. 5 shows a door positioning diagram, according to the present invention.

The present invention is concerned primarily with the control strategy 10 for actuating the TRIAC switches for applying or removing power to the motors. As previously discussed, the control strategy 10 of the present invention may be embodied in a signal processor of some sort, such as a microprocessor, and as such responds to sensor signals on line 28 from the sensor 22 and command signals on the line 24 from the elevator controller (not shown) and provides switching commands on the line 26 to the motor control 12 for controlling the state of the LIM 14. Of course, the control strategy may be carried out within the (not shown) elevator controller itself. In this manner, the computer control strategy 10 is capable of controlling the velocity and acceleration of the door 20 so that its motion conforms to a desirable motion profile as shown in FIGS. 2a, 2d or 2e. A door positioning diagram of FIG. 5 shows possible door positions during operation. The door is shown in the fully-closed position, having a current position (P) of zero and a distance-to-go (DTG) of the full range of motion. The distance-to-go (DTG) always represents an absolute distance, irrespective of whether the door is opening or closing. In one particular embodiment, the full range of motion for a complete open or close sequence is 550 mm. Accordingly, the current position (P) is equal to the distance-to-go (DTG) when the door is in the fully open position.

Turning now to the example of FIG. 6, while in motion, the door is always operating in one of the three illustrated operating modes, to be explained in more detail subsequently. The horizontal axis shows the current position, which can have a value from zero to the maximum door travel. The optimal switching point (SPT) is the position selected at which the motor is switched from full acceleration in the direction of travel, to full deceleration opposite to the direction of travel. The vertical axis indicates the door velocity and ranges from zero to the open sequence maximum velocity (VMAX-OPEN). V2 represents the minimum velocity at which the door will travel to complete a close or open sequence, without contacting the open or close stop with excessive force and without requiring an excessive delay in completing the open or close sequence.

Figure 6:
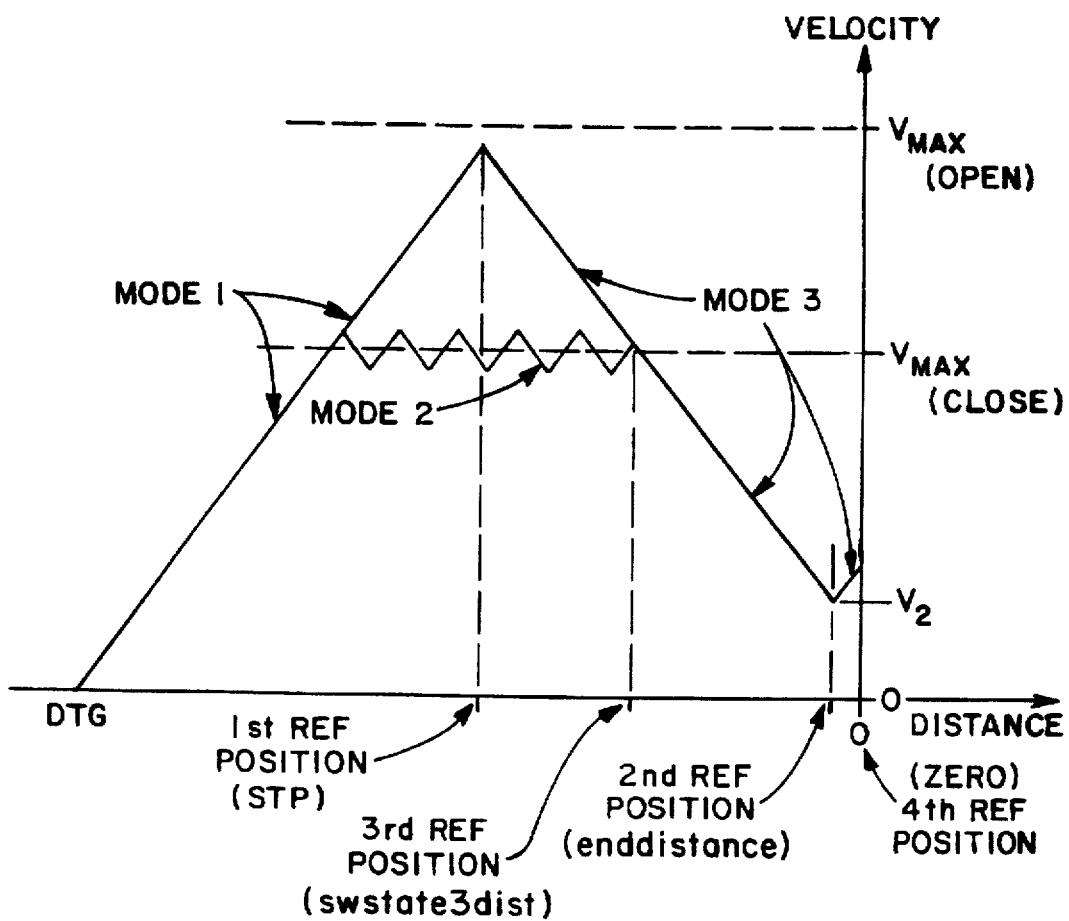
FIG. 6 shows another example of various door operating modes, according to the present invention.
Figure 7A:
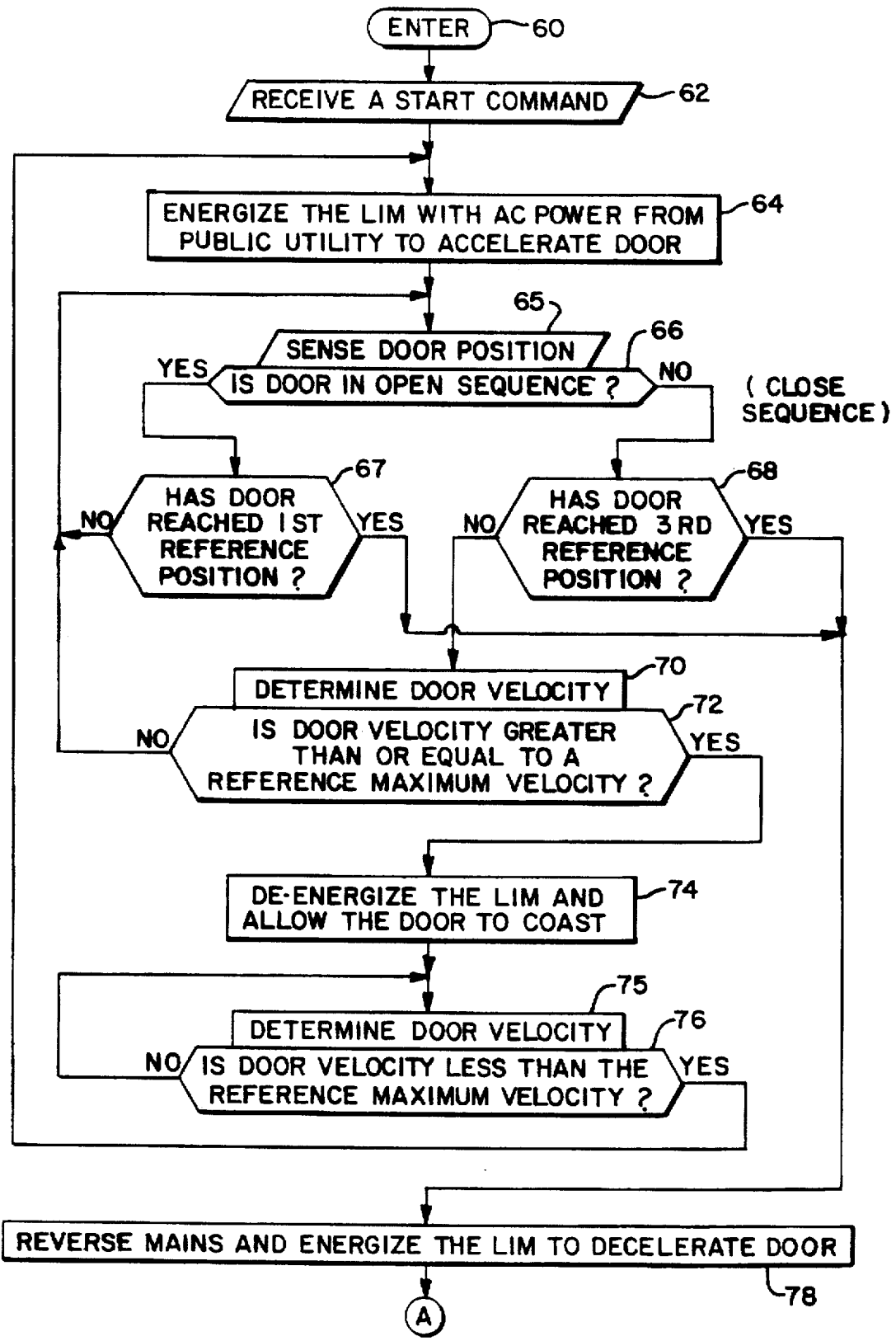
FIGS. 7a and 7b together show a flow chart for carrying out a control strategy, according to the present invention.
Figure 7B:
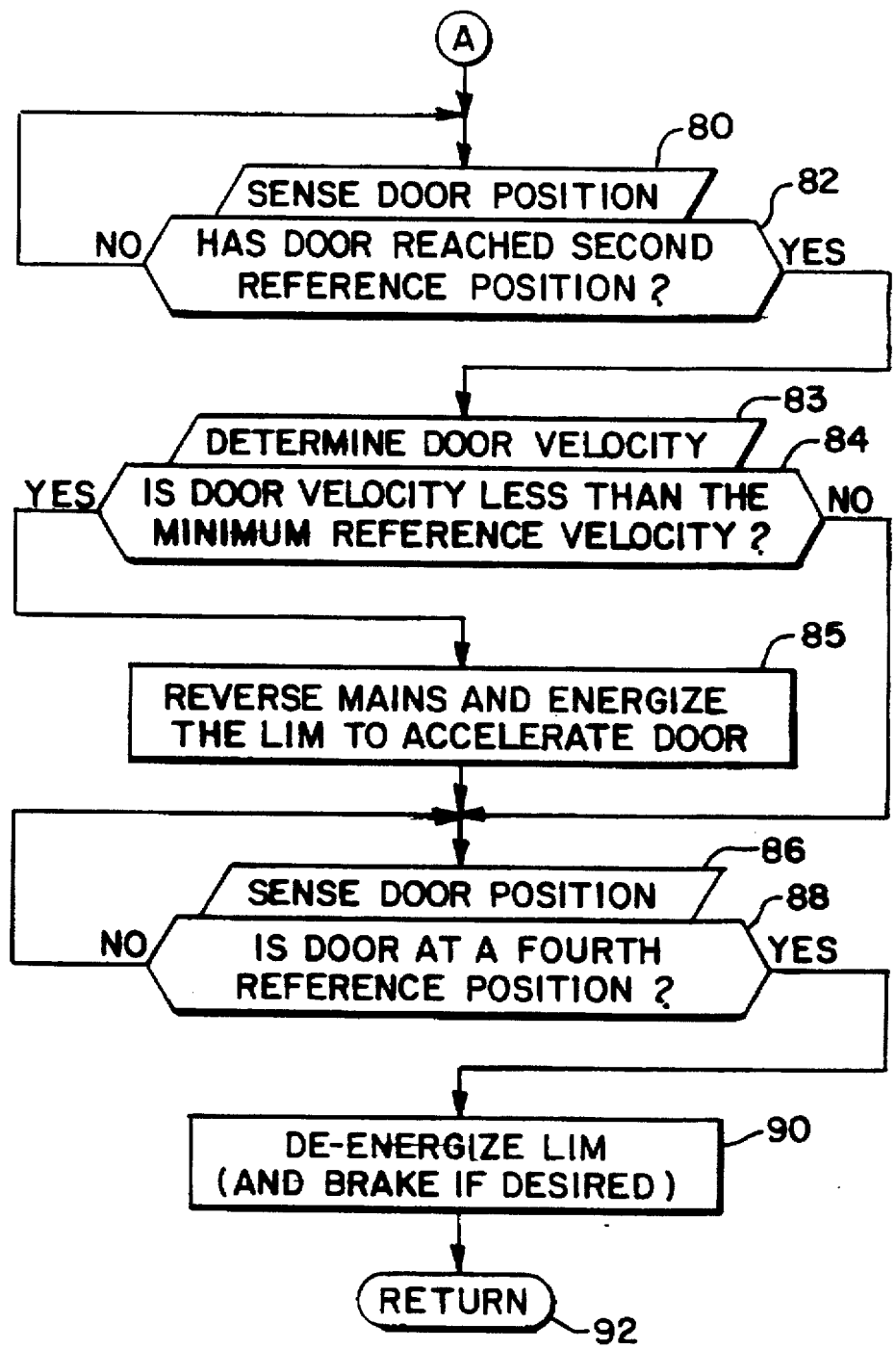

Turning now to FIGS. 7a and 7b, a flow chart is presented which may be used in conjunction with a signal processor for carrying out the control strategy 10 of the present invention. This could be done on a signal processor including a central processing unit, a random access memory, a read-only memory, a clock, a data bus, an address bus and control lines, as will be evident to one of skill in the art. After entering in a step 60, a start command is received on the line 24 of FIG. 1, as indicated in a step 62. This command may come from the elevator controller (not shown) or the computer control strategy 10 may be incorporated in a signal processor within the elevator controller itself for carrying out other functions. In any event, after receiving the start command, as indicated in a step 62, the linear induction motor (LIM) is energized with three-phase AC power 16 in step 64, as shown in FIG. 1, through the motor control 12 in order to accelerate the door. Once the door is accelerated, according to the step 64, the door position may be sensed, as indicated in a step 65 by means of the sensor 22 of FIG. 1, which provides the sensed position signal on the line 28 back to the means 10 for carrying out the computer control strategy of the present invention. Such means will include various stored signals indicative of various reference positions and velocities, which may be provided on the command line 24 of FIG. 1. In a step 66, the computer control strategy 10 checks an input to determine whether the present sequence is an open sequence or close sequence. If the sequence is an open sequence, a comparison is made, as indicated in a step 67, between the current door position as sensed in step 65 and a first reference position such as SPT in FIG. 6. If the door has not yet reached the first reference position, then step 65 et. seq. is reexecuted, and the current door position updated. On the other hand, if the door has reached the first reference position or current position is determined to be less than the first reference position, then the door has reached the optimum switching point, SPT, and step 78 is executed, whereby the LIM is energized to decelerate the door. Alternatively, if in step 66 it is determined that the door is not in the open sequence and thus is in the close sequence, step 68 is executed. In step 68, a comparison is made between the current door position and a third reference position, such as swstate3dist in FIG. 6. If the door has not reached the third reference position in step 68, then the door velocity is determined as indicated in a step 70. The so-determined door velocity is then compared in a step 72 to a reference maximum velocity VMAX-CLOSE and, if not greater than or equal thereto, the step 65 et seq. is reexecuted. If it is greater, then a step 74 is executed to deenergize the LIM and allow the door to coast. In the alternative, instead of allowing the door to coast, the step 74 could reverse the AC mains and energize the LIM to positively decelerate the door. In either event, a step 75 is next executed to determine door velocity from sensed position and a time reference clock and determine if the deceleration has brought it to below the reference maximum velocity VMAX-CLOSE. If not, the steps 75–76 are executed repeatedly until it is. Once the door velocity falls to less than the reference maximum velocity VMAX-CLOSE, e.g., by some delta, the step 64 is again executed to energize the LIM with the AC power mains from the public utility to accelerate the door. The door position is then sensed again in the step 65, and a determination is made in the step 66 as to whether the door is in an open or close sequence. Assuming it is a close sequence, then step 68 is executed to determine whether the door has reached the third reference position. If not, the door velocity is again determined in the step 70 and a determination is made in the step 72 if the door velocity is greater than or equal to the reference maximum velocity. If so, the LIM is deenergized and the door again allowed to coast. These various steps are repeated again until the step 68 determines that the door has reached the third reference position swstate3dist, as shown in FIG. 6.

In either event, the steps 67 and 68 will eventually determine that the door has reached either the applicable first reference position SPT or the third reference position swstate3dist and a step 78 will next be executed to reverse the mains and energize the linear induction motor to decelerate the door.

Turning now to FIG. 7b, a step 80 is next executed in order to sense the door position again. Or, the sensed value of step 65 or a similar step can be used. Once sensed, a determination is made in a step 82 as to whether or not the door has reached a second reference position, i.e., the position labeled end distance of FIG. 6. If not, the door position is sensed again in the step 80 and a redetermination made in the step 82 until the door is found to be at the second reference position. A step 83 is then executed to determine the door velocity which is compared in a step 84 to the minimum reference velocity, V2 of FIG. 6. If the current door velocity is less than V2, then a step 85 is then executed to reverse the three-phase AC mains 16 of FIG. 1 by means of the motor control 12 in order to energize the linear induction motor to accelerate the door for the small distance between the end distance point and a zero point, where the door is either fully open or fully closed. Once the LIM has been energized to accelerate the door in step 85, or if in step 84 the current door velocity was determined not to be less than V2, then the door position is again sensed in a step 86 and a determination is made in a step 88 as to whether or not the door has reached at a fourth reference position, i.e., the zero position, representing a fully-opened or fully-closed door. If not, the door is allowed to continue accelerating until the door reaches the zero position. Once made, the LIM is deenergized as indicated in a step 90, allowing the door to coast to a stop. A return is then made in a step 92.

Turning now to a discussion of the three modes in which the moving door can be operating during either a close or open sequence:

While operating in mode 1, according to the leftmost portion of the motion profile of FIG. 6, the LIMs are energized and the door is accelerating.

If the door is in an open sequence, then it will be allowed to accelerate beyond the VMAX-CLOSE limit. In the open sequence, the door will reach the switching point SPT prior to achieving a velocity equal to or greater than VMAX-OPEN. Upon reaching the SPT position, the motor will be switched from full acceleration to full deceleration to decelerate the door.

On the other hand, if, upon reaching a velocity of VMAX-CLOSE, the door is in a close sequence, then it is desirable to enter mode 2 to maintain door velocity around VMAX-CLOSE so that selected kinetic energy limits are not exceeded.

As explained earlier and as shown in FIG. 2(e), to maintain the door velocity around the VMAX-CLOSE limit, the motor will have to alternate between either acceleration and deceleration or acceleration and off. That is, when alternating between acceleration and deceleration, the motor will accelerate the door until the current velocity exceeds VMAX-CLOSE, at which time the motor will be energized in a deceleration mode until the door velocity drops below VMAX-CLOSE. At that point, the motor will again be energized in an acceleration mode to increase the door velocity back to VMAX-CLOSE. This alternating of the motor between an acceleration and deceleration mode under the bang-bang implementation achieves an average constant velocity approximately equal to VMAX-CLOSE. This continues until the door reaches an swstate3dist position, at which time the door will be decelerated to a stop. The swstate3dist position represents the optimum position from which the door, velocity of VMAX-CLOSE, should be continuously decelerated to reach the enddistance position at a velocity of V2.

Alternatively, after achieving a velocity in excess of VMAX-CLOSE, the motor will be turned off, allowing the door to coast until the velocity drops below VMAX-CLOSE. At that point, the motor will again be energized to accelerate the door until the door velocity again exceeds VMAX-CLOSE.

In an operating mode 3, the door is decelerating after having reached the switching point (SPT) from mode 1, or swstate3dist from mode 2 and will decelerate to the V2 minimum velocity prior to the completion of the close or open sequence. Having achieved a velocity less than or equal to V2 at a position less than or equal to the enddistance position, the LIM is are energized to accelerate the door into the close or open stops to complete the open or close sequence. V2 and enddistance are selected so as to minimize the open and close sequence time, while avoiding damage to either the door or the open and close stops. V2 and enddistance are also selected to ensure that the door will not stop completely before reaching the enddistance position.

As would be appreciated by one skilled in the art, the computer control strategy 10 must constantly evaluate the sensor signals on the line 28 provided by the sensor 22 and the command signals on line 24 provided by the elevator controller (not shown) and, based on those inputs, generate an appropriate sequence of switching commands to the motor control 12 on the line 26.

Figure 8:
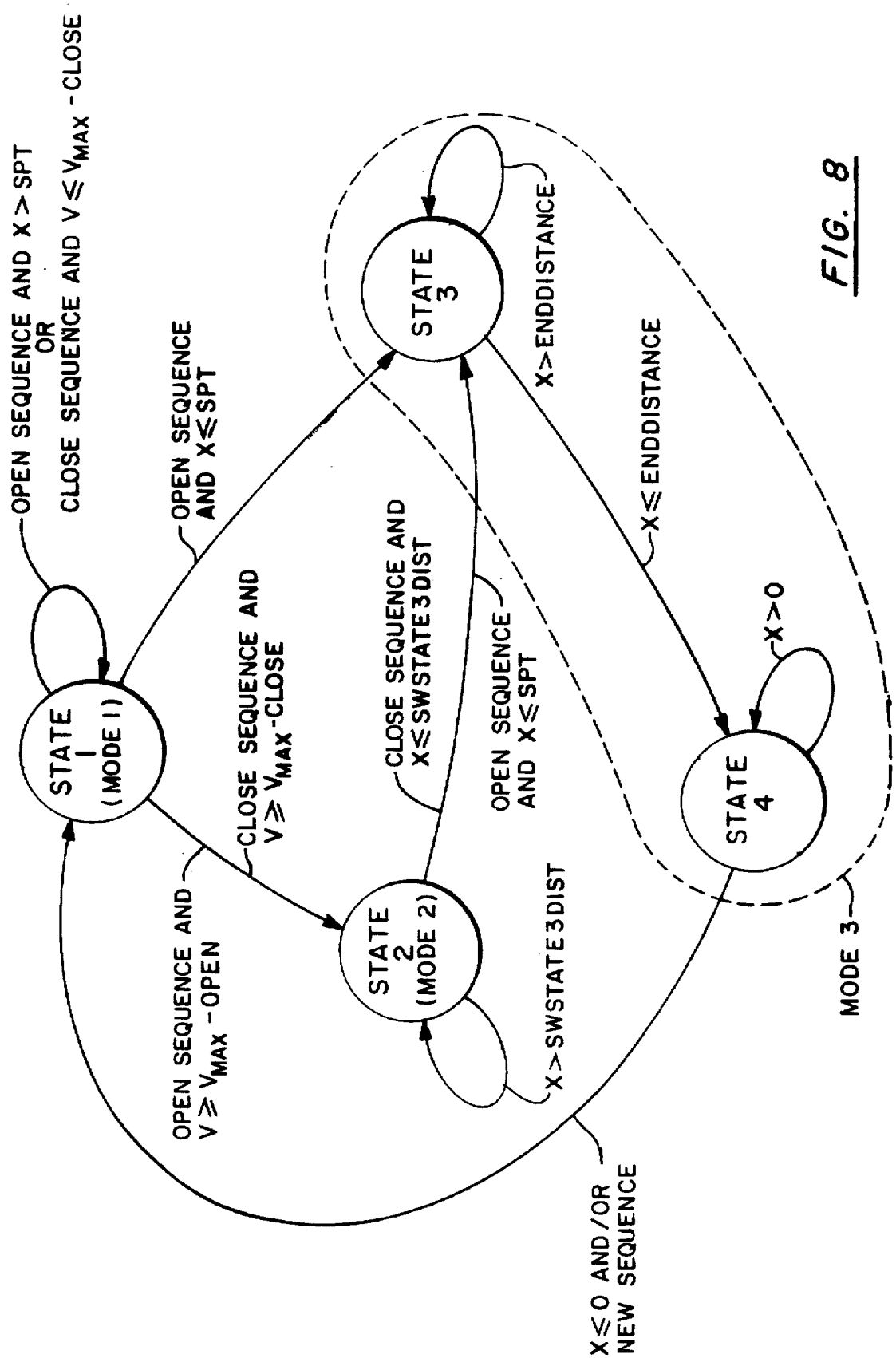
FIG. 8 shows a state machine representation of the operating modes shown in FIG. 6.

Turning now to FIG. 8, a state diagram of the motion profile illustrated in FIG. 6 is shown. Generally, state 1 of FIG. 8 corresponds to mode 1 of FIG. 6. In addition, state 2 of FIG. 8 corresponds to mode 2 of FIG. 6. Finally, states 3 and 4 of FIG. 8 correspond to mode 3 of FIG. 6.

Starting in state 1, the state machine will remain in state 1 if the door is in an open sequence and the remaining distance to go, (X) in either an open or close sequence is greater than SPT, or if the door is in a close sequence and V is less than or equal to VMAX-CLOSE. On the other hand, if in state 1 the door is in a close sequence and V is greater than or equal VMAX-CLOSE, then the state machine will transition to state 2. Alternatively, if the door is in an open sequence and X is less than or equal to SPT (the door has reached the SPT position), then the machine will transition to state 3.

Once in state 2, the machine will remain in state 2 whenever X is greater than or equal to swstate3dist position. That is, the machine will be maintaining the door velocity around approximately VMAX-CLOSE until the door reaches the swstate3dist position. As shown in FIG. 8, once X is less than or equal to swstate3dist, the machine will transition to state 3. Once in state 3, the LIM will be energized to decelerate the door. The machine will remain in state 3 as long as X is greater than enddistance. However, once X is less than or equal to enddistance (the door has reached the enddistance position), the machine will transition to state 4, where the door will be accelerated from enddistance to zero, as previously discussed.

Having transitioned to state 4, the machine will again energize the LIM to accelerate the door to the final open or close position. The machine can be made to remain in state 4 until the next sequence begins or for as long as desired. That is, the machine can be made to continue to accelerate the door as long as desired or until the door has completed the open or close sequence. In any event, once the door has completed the open or close sequence, the machine will transition back to state 1. This is generally indicated in FIG. 8 as a transition between state 4 and state 1 when X is less than or equal to zero or a new sequence is commanded and the control indicates the sequence is finished.

Turning now to FIG. 9, it shows the computer control strategy 10 inputs and outputs, which are explained below. All input values are indicated by a 0, 1 or a series of 0s and 1s. A 1 indicates an asserted input bit, without regard to whether "positive" or "negative" logic is used, while a 0 indicates a non-asserted input bit.

SPT, enddistance, VMAX, V2, mode2decel, mode3endaccel, mode3decel and MOTSTATE are inputs, to be described more fully below, which may be provided by the elevator controller (not shown) as part of the command signal on line 24 or may be provided by the sensor 22 as part of the sensor signals on line 28, or may be stored in ROM within the computer control strategy 10 itself.

OPMODE represents the current operating mode of the door when in motion, as described above in connection with FIG. 6.

X represents the remaining distance to go, either in a close or open sequence, as compared to the switching point (SPT), enddistance and swstate3dist. A value of 00 indicates that X is greater than enddistance. A value of 01 indicates that X is greater than SPT. A value of 10 indicates that X is less than enddistance. A value of 11 indicates that X is less than or equal to swstate3dist. V represents the current velocity as compared to VMAX (open or close, as the case may be) and V2. A value of 00 indicates that the current velocity is less than VMAX. A value of 01 indicates that the current velocity is greater than or equal to VMAX. A value of 10 indicates that the current velocity is less than V2. Finally, a value of 11 indicates that the current velocity is greater than or equal to V2.

The mode2decel input indicates whether the computer control strategy 10 should allow the door 20 to merely coast or whether the door should be decelerated when the door velocity exceeds VMAX, as shown in FIG. 2(e), while in operating mode 2.

The mode3endaccel input indicates whether the computer control strategy 10 should accelerate the door 20 after the door velocity has dropped to approximately 0, at a distance just short of the fully-open or fully-closed position (enddistance), as shown in FIGS. 2d and 2e. A value of 1 indicates that the door should be accelerated from this position to the fully-open or fully-closed position, while a value of 0 indicates that the door should not be accelerated in this situation. A value of 0 indicates that the door 20 should be allowed to coast, while a value of 1 indicates that the door 20 should be decelerated.

Similarly, the mode3decel input indicates whether the computer control strategy 10 should allow the door 20 to merely coast or whether the door 20 should be decelerated when the door velocity exceeds VMAX, as shown in FIG. 2e, while operating in mode 3.

The final input, MOTSTATE, indicates the current state of the TRIAC switches controlling the motors. As shown in FIG. 8, a value of either 00 or 11 indicates that the TRIAC switches are off. On the other hand, a value of 01 indicates that the motors are energized in the direction of travel to accelerate the door 20, while a value of 10 indicates that the motors are energized in a direction opposite to the current direction of travel to decelerate the door 20.

The outputs include two bits for controlling the motors. A value of 00 turns the TRIACs off, allowing the door 20 to coast. A value of 01 turns the TRIACs on, so that the motors are energized in the current direction of travel to accelerate the door 20, while a value of 10 turns the TRIACs on so that the motors are energized opposite to the direction of travel, decelerating the door 20.

Referring now to FIGS. 6, 8, 9 and 10, a detailed description of the operation of the controller state machine follows.

Figure 10:
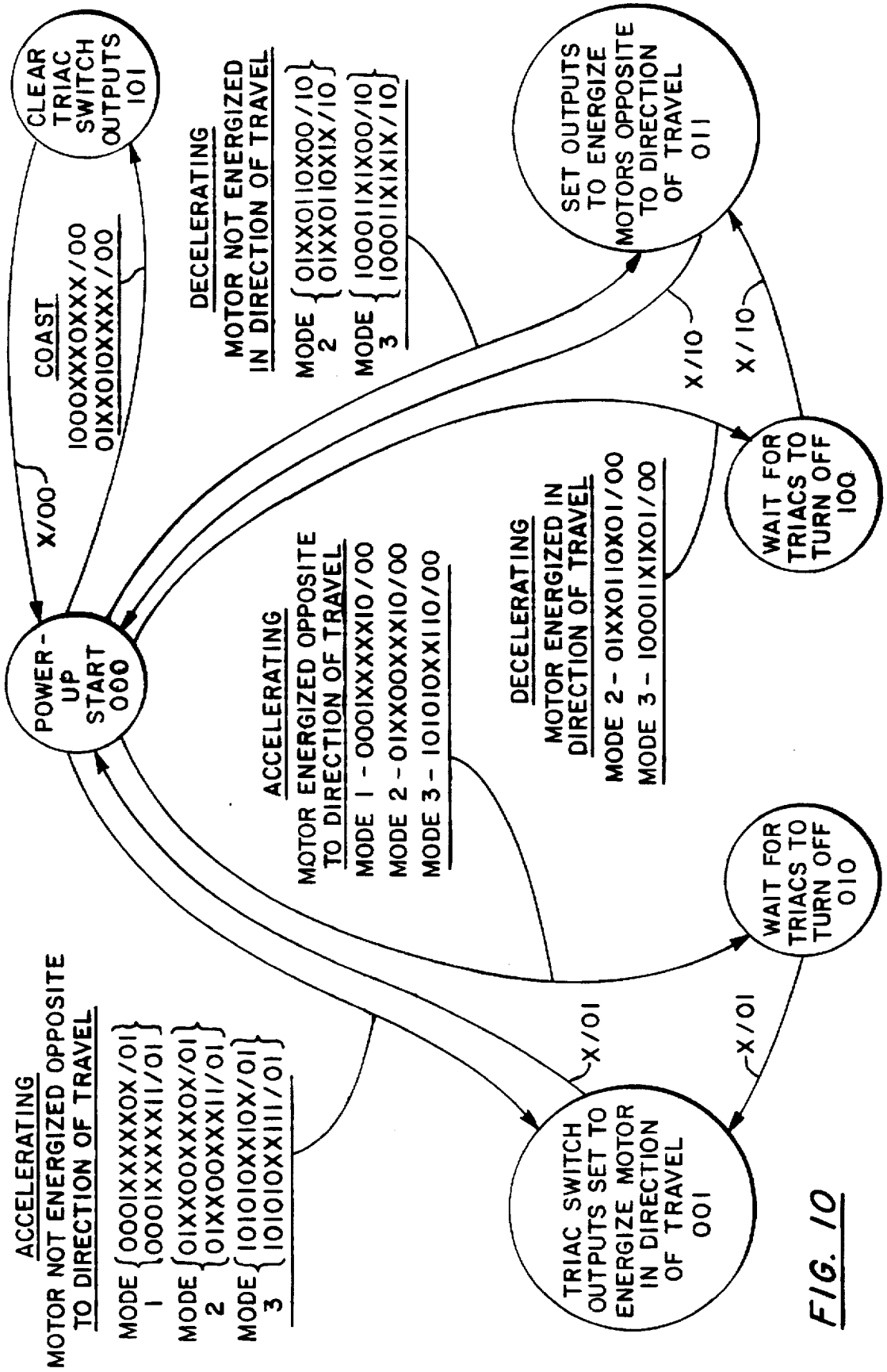
FIG. 10 shows a controller state diagram according to the present invention.

Each state in the diagram of FIG. 10 will be described along with the requirements and conditions for transition out of the state to another succeeding state. It should be understood that the actual hardware implementation of the computer control strategy 10 would require a programmer to encode all of the requirements of both FIGS. 8 and 10 in a particular language according to the particular hardware being used. FIG. 8 illustrates the state machine transition from different operating modes, while FIG. 10 illustrates the energizing of the LIMs opposite to or in the direction of travel or deenergizing them altogether to accelerate or decelerate or "coast" the door. However, the encoding details are not described, because the particular hardware and programming techniques utilized are a matter of choice and do not embrace the inventive concept. Each of the state transitions includes a series of 0s, 1s and Xs, separated by a forward slash "/". As described previously in the Table of FIG. 9, a 0 represents a nonasserted value, while a 1 represents an asserted value, irrespective of a "positive" or "negative" logic implementation. An X is a "don't care", meaning that particular bit can have a value of either 0 or 1 without affecting the operation of the computer control strategy 10. Inputs are presented to the left of the "/", while outputs of FIG. 8 are shown to the right of the "/".

Referring to FIG. 10, upon application of power to the machine, a power on state 000 will be entered after all self-test checking by the selected means for carrying out the control strategy 10. After entering the power on state 000, the computer control strategy 10 begins processing inputs to determine what action, if any, should be taken. As would be appreciated by one skilled in the art, numerous other control signals would be present in this system, and at this point in time, would have been asserted to put the machine in a running state.

In the power on 000 state, a door open or door close command has already been initiated by the elevator controller (not shown) and the close or open sequence begun. Specifically, at this point the motors are already energized so as to either open or close the door.

Starting in state 000, there are three conditions under which the computer control strategy 10 will proceed to state 001, wherein the TRIAC outputs will be set to accelerate the door 20.

In the first scenario, indicated by the input state of 000100XXX0X or 000100XXX11, the door is operating in mode 1, with an increasing velocity but the remaining distance to go (X) is greater than the switching point (SPT).

In the second scenario, indicated by the input state of 01XX00XXX0X or 01XX00XXX11, the door is operating in mode 2, with a velocity approximately equal to VMAX (close), but less than VMAX (close).

In the third scenario, indicated by the input state of 101010XXX0X or 10XX10XXX11, the door is operating in mode 3, whereby the door is decelerating, the velocity which has decreased to V2 at the enddistance position and the mode 3 endaccel signal is asserted, indicating that the door should be accelerated into the open or close stop instead of merely coasting into the stop.

Note that any of these four transitions from state 000 to state 001 set the outputs to 01 to energize the motor in the direction of travel to accelerate the door 20. After state 001, the computer control strategy 10 returns to state 000 in all cases.

The transition from the power up state 000 to state 010 is very similar to the transition between the power up state 000 and state 001, except that the least significant input bits, representing the state of the TRIACs, are 10 in all circumstances, indicating that the motors are presently energized opposite to the direction of travel. Consequently, to avoid shorting in all three cases, the output is set to 00, indicating that the TRIACs are to be cleared and that the computer control strategy 10 will wait for the TRIACs to turn off in state 010 before proceeding to state 001 to accelerate the door 20. Therefore, after waiting for the TRIACs to turn off in state 010, the controller automatically proceeds to state 001, setting the outputs to 01 to energize the motors in the direction of travel and accelerate the door 20.

Returning now to the power up state 000, there are two sequences where the computer control strategy 10 will proceed to state 011 to energize the motors opposite to the current direction of travel and decelerate the door 20.

In the first scenario, the door is operating in operating mode 2, indicated by the input state of 01XX0110X00 or 01XX0110X1X, wherein V is approximately equal to VMAX (close), but greater than VMAX (close) and the mode 2 decel variable is asserted, indicating, as shown in FIG. 2e, that the door 20 should be decelerated when the door velocity is greater than VMAX.

In the second scenario, indicated by the input of 10001101X00 or 10001101X1X, the door is operating in mode 3, whereby the door is decelerating, but the V is greater than or equal to the minimum velocity V2, the door has not yet reached the enddistance position and the mode3decel variable is asserted, again indicating that the door 20 should be decelerated.

The transition from the power up state 000 to state 100 is almost identical to the transition between state 000 and 011, except that with regard to the inputs, the least two significant bits, referring to the present state of the motors, are 01, meaning that the motors are energized in the direction of travel and therefore must be turned off prior to energizing the motors in the opposite direction of travel to avoid shorting. After waiting for the TRIACs to turn off in state 100, the controller automatically proceeds to state 011, setting the outputs to decelerate the door 20. After state 011, the controller automatically return to the power up state 000.

Finally, with regard to the transition between the power up state 000 and the coast state 101, the transition will occur on the inputs 01XX010XXXX, or 1000 XXX0XXX, as shown. Upon this transition, the TRIAC switch outputs will be cleared, allowing the door to coast. The controller automatically returns from state 101 to the power up state 000, keeping the TRIAC outputs cleared.

Referring back to FIGS. 6 and 8, it should be realized that variations of the mode and state diagrams shown therein are certainly possible and within the scope of the present invention. For instance, in connection a door open sequence in mode 1 it is possible to make provision for the door reaching the VMAX-OPEN velocity before reaching the first reference position (SPT) by causing the door, in that event, to enter mode 2, i.e., a quasi-constant velocity mode. It could be assumed that such a velocity would only be reached before the door reaching the first reference position. In that event, the transition from state 1 to state 2 in the state diagram of FIG. 8 could include a transition for the open sequence wherein the velocity is found to be greater than or equal to the VMAX-OPEN velocity. A transition from state 2 to state 3 would then be made in the open sequence when X is detected as being less than or equal to SPT. Similar changes would be made to the flow chart shown in FIG. 7. It is also possible for a switch to be made from mode 1 to mode 3 in the door open sequence when VMAX is reached, ignoring the first reference position in that event. In other words, instead of transitioning to state 2, upon detecting V greater than VMAX-OPEN, a transition would be made directly from state 1 to state 3 in FIG. 8 in that event.

Referring back to FIG. 1, and the details of FIG. 3, it should be realized that a detailed description of the motor control may be found in copending U.S. patent application Ser. No. 08/533,596 in connection with FIGS. 5–11 thereof, beginning at page 11, line 12 through page 17, line 26, which is hereby incorporated by reference for background. Similarly, although a particular linear motor arrangement has been shown in FIG. 1, and particularly a winding for a primary therefor in FIG. 4, it should be realized that copending U.S. patent application Ser. No. 08/533,593 provides a complete and detailed description of various embodiments of linear induction motors for elevator door applications such as the present application, particularly in connection with FIGS. 5–11 thereof and described beginning at page 10, line 31 and continuing through page 14, line 17, which is hereby incorporated by reference for background. Similarly, other linear induction motors may be used in connection with the present invention for operating an elevator door, such as disclosed in copending U.S. patent application Ser. No. 08/533,595, as described in FIGS. 1–10 thereof, beginning at page 4, line 7 through page 8, line 7, which is hereby incorporated by reference for background.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. Method for operating an elevator door with a linear induction motor, comprising the steps of:

energizing, in response to a start command, the linear induction motor with AC power mains fixed in frequency at fifty or sixty Hertz for accelerating said door at full thrust and constant acceleration;

sensing door position for providing a sensed signal and, for a door open sequence:

while an opening velocity of said elevator door is increasing at said full thrust and constant acceleration, comparing said sensed signal to a first reference position signal (SPT) for providing a first reverse command signal;

deenergizing the linear induction motor in response to the first reverse command signal and reenergizing the linear induction motor with the AC power mains for decelerating said door at full thrust add constant deceleration;

while the opening velocity of said elevator door is decreasing at said full thrust and constant deceleration, comparing said sensed signal to a second reference position signal (enddistance) for providing a second reverse command signal; and deenergizing the linear induction motor in response to the second reverse command signal and reenergizing the linear induction motor with the AC power mains for accelerating said door at full thrust and constant acceleration into a stop.

2. The method of claim 1, further comprising the steps of:

comparing said sensed signal to a fourth reference position signal (0) for providing a stop signal; and deenergizing the linear induction motor in response to said stop signal.

3. The method of claim 2, further comprising the step of braking said door in response to the stop signal.

4. The method of claim 1, where in addition to said step of sensing door position for providing a sensed signal for a door open sequence, said method further comprises for a door close sequence, the steps of:

providing, during said step of energizing, a velocity signal indicative of a closing velocity of said door;

while the closing velocity is increasing at said full thrust and constant acceleration, comparing said velocity signal to a maximum velocity reference signal (VMAX-CLOSE) for providing, in the presence of the velocity signal equaling or exceeding the maximum velocity reference signal, a constant velocity command signal;

deenergizing the linear induction motor in response to the constant velocity command signal and either allowing said door to coast or reenergizing said linear induction motor with the AC power mains for constantly decelerating said door at full that until said sensed velocity signal falls below said maximum velocity reference signal;

reenergizing the linear induction motor for constantly accelerating said door at full thrust and repeating said steps of comparing said velocity signal and deenergizing the linear induction motor followed by this step of reenergizing until a third reverse command signal is provided;

comparing said sensed signal to a third reference position signal (swstate3dist) for providing said third reverse command signal;

reenergizing the linear induction motor for constantly decelerating said door at full thrust and, while the closing velocity is decreasing at said constant deceleration, comparing said sensed signal to said second reference position for providing said second reverse command signal; and deenergizing the linear induction motor in response to the second reverse command signal and reenergizing the linear induction motor with the AC power mains for constantly accelerating said door at full thrust into a stop.

5. The method of claim 4, further comprising the steps of:

for said door close sequence, comparing said sensed signal to a fourth reference position signal (0) for providing a stop signal; and deenergizing the linear induction motor in response to said stop signal.

6. The method of claim 5, further comprising the step of braking said door in response to the stop signal in said door close sequence.

7. Apparatus for operating an elevator door, comprising:

a linear induction motor (14, 18), responsive to switched alternative current (29), for moving said door;

a sensor (22), responsive to said moving said door, for providing a sensed signal indicative thereof;

a controller (10), responsive to a start command signal (24) and to said sensed signal, for providing a switch signal (26); and a motor control (12) for connection to alternating current utility mains (16), responsive to said switch signal (25), for providing said switched alternating current directly to said linear induction motor for constantly accelerating said door at full thrust for a door open sequence until a fist reference position is sensed by said sensor and then constantly decelerating said door at full thrust until a second reference position is reached.

8. The apparatus of claim 7, wherein said motor control comprises:

means for energizing, in response to said start command, the linear induction motor with said alternating current utility mains for constantly accelerating said door at said full thrust;

means for deenergizing the linear induction motor in response to a second reverse command signal and reenergizing the linear induction motor with the alternating current utility mains for constantly accelerating said door at said full thrust into a stop.

9. The apparatus of claim 7, wherein said controller comprises:

means for operating in a first acceleration state (1) for a door open sequence until the first reference position (SPT) is reached and for a door close sequence until a maximum velocity (VMAX-CLOSE) is reached;

means for operating in a quasi-constant velocity state (2) at said maximum velocity for said door close sequence until a third reference position (swstate3dist) is reached;

means for operating in a deceleration state (3) from said first reference position for said door open sequence and from said third reference position for said door close sequence until a second reference position (enddistance) is reached;

means for operating in a second acceleration state (4) from said second reference position to a fourth reference position (zero) for both said door open and door close sequences for stopping said door.

10. The apparatus of claim 7, wherein said controller comprises:

means for opecating in a first mode for said accelerating said elevator door until said first reference position is reached in said opening sequence or until a reference velocity is reached in either said opening sequence or in a closing sequence;

means for operating in a quasi-constant velocity state at said reference velocity until said first reference position is reached in said opening sequence or until a third reference position is reached in said closing sequence; and means for operating in a deceleration state from said first or third reference positions until a second reference position is reached.

11. Method for operating an elevator door with a linear induction motor, comprising the steps of:

connecting utility mains directly to the motor for operating in a first acceleration state (1) at full thrust for a door open sequence until a first reference position (SPT) is reached and for a door close sequence until a maximum velocity (VMAX-CLOSE) is reached;

operating in a quasi-constant velocity state (2) at said maximum velocity for said door close sequence until a third reference position (swstate3dist) is reached;

reverse connecting said utility mains directly to the motor for operating in a deceleration state (3) at full reverse thrust from said first reference position for said door open sequence and from said third reference position for said door close sequence until a second reference position (enddistance) is reached;

connecting said utility mains directly to the motor for operating in a second acceleration state (4) at full thrust from said second reference position to a fourth reference position (zero) for both said door open and door close sequences for stopping said door.

12. The method of claim 9, wherein said elevator door is operated in said quasi-constant velocity state by selectively energizing and deenergizing said linear induction motor.

13. Method for operating an elevator door with a linear induction motor, comprising the steps of:

operating in a first mode for accelerating an elevator door at full thrust until in a door open sequence a first reference position is reached, or in either said door open sequence or a door close sequence, a reference velocity is reached;

in a case of reaching said first reference velocity, in either said door open or close sequence, operating in a quasi-constant velocity state at said reference velocity by alternating between accelerating at full thrust and either coasting or decelerating at full thrust until a first reference position in an open sequence or a third reference position in a close sequence is reached; and operating in a deceleration state at full thrust from said first reference position or third reference position until a second reference position is reached.

14. The method of claim 13, further comprising the step of operating in a second acceleration state from said second reference position to a fourth reference position.

15. The apparatus of claim 7, wherein said controller comprises:

means for comparing said sensed signal to a first reference position signal indicative of said first reference position for providing said switch signal as a first reverse command signals; and means for comparing said sensed signal to a second reference position signal indicative of said second reference position for providing said switch signal as a second reverse command signal.

* * * * *